United States Patent [19]
Elbert et al.

[11] 3,975,165
[45] Aug. 17, 1976

[54] GRADED METAL-TO-CERAMIC STRUCTURE FOR HIGH TEMPERATURE ABRADABLE SEAL APPLICATIONS AND A METHOD OF PRODUCING SAID

[75] Inventors: Raymond John Elbert, Middleburg Heights; Alan De Vere Butcher, Parma Heights, both of Ohio

[73] Assignee: Union Carbide Corporation, New York, N.Y.

[22] Filed: Dec. 26, 1973

[21] Appl. No.: 427,493

[52] U.S. Cl. ............................... 29/182.2; 29/182.3; 29/182.5; 29/195; 75/208 R; 75/211; 75/224; 264/60; 264/65; 264/113; 264/319; 277/96; 277/235 A; 415/174; 427/190; 427/191; 427/203; 427/204; 427/205; 428/212; 428/217; 428/446; 428/450; 428/472; 428/320

[51] Int. Cl.² ...................... B22F 5/00; B22F 7/00; B22F 7/06; C04B 39/12

[58] Field of Search ............ 29/182.2, 182.3, 182.5, 29/195 M; 75/208 R, 211, 224; 117/70 A, 70 C, 71 R, 71 M, 129; 156/245; 161/46, 166, 213; 264/60, 65, 113, 319; 415/174; 277/96, 227, 235, 236, 235 A; 427/190, 191, 203, 204, 205; 428/212, 217, 446, 450, 472

[56] References Cited
UNITED STATES PATENTS

| | | | |
|---|---|---|---|
| 1,324,582 | 12/1919 | Braun | 264/113 |
| 1,567,020 | 12/1925 | Beecher et al. | 264/113 |
| 1,599,084 | 9/1926 | Gibson | 264/113 |
| 1,614,926 | 1/1927 | Jeppson et al. | 264/60 |
| 1,830,826 | 11/1931 | Cox | 264/113 |
| 1,944,709 | 1/1934 | Friedersdorff | 264/113 |
| 2,697,670 | 12/1954 | Gaudenzi et al. | 428/472 |
| 2,826,512 | 3/1958 | Rex | 117/70 |
| 2,930,521 | 3/1960 | Koehring | 415/174 |
| 2,962,809 | 12/1960 | Short et al. | 415/174 |
| 3,046,648 | 7/1962 | Kelly | 415/174 |
| 3,053,694 | 9/1962 | Daunt et al. | 415/174 |
| 3,054,694 | 9/1962 | Oves | 29/195 M |
| 3,068,016 | 12/1962 | Dega | 415/174 |
| 3,091,548 | 5/1963 | Dillon | 29/195 M |
| 3,097,329 | 7/1963 | Siemens | 29/182.2 |
| 3,120,919 | 2/1964 | Gardiner | 415/174 |
| 3,126,149 | 3/1964 | Bowers et al. | 415/174 |
| 3,339,933 | 9/1967 | Foster | 415/174 |
| 3,340,025 | 9/1967 | Milch et al. | 29/195 M |
| 3,411,794 | 11/1968 | Allen | 415/174 |
| 3,505,158 | 4/1970 | Murray | 161/166 |
| 3,620,799 | 11/1971 | Hoelscher | 117/71 M |
| 3,743,569 | 7/1973 | Wilkins et al. | 161/166 |
| 3,802,850 | 4/1974 | Clougherty | 29/182.2 |
| 3,825,364 | 7/1974 | Habila et al. | 415/174 |
| 3,868,267 | 2/1975 | Gazza et al. | 264/60 |
| 3,880,550 | 4/1975 | Corey et al. | 415/174 |

*Primary Examiner*—J.C. Cannon
*Attorney, Agent, or Firm*—J. Hart Evans

[57] ABSTRACT

Abradable seal composite structure having a porous, abradable ceramic surface layer which is resistant to high temperature oxidation and a metallic bottom layer capable of being bonded to a metallic substrate, with at least two intermediate layers consisting of ceramic/metal mixtures. The intermediate layer next to the ceramic layer has the highest ceramic content, with the remaining intermediate layers having progressively lower ceramic content and correspondingly higher metallic contents. The composite is made by laying up the layers in wet paste form and then drying them, after which the composite can be heated to bond it to the metallic substrate.

15 Claims, No Drawings

GRADED METAL-TO-CERAMIC STRUCTURE FOR HIGH TEMPERATURE ABRADABLE SEAL APPLICATIONS AND A METHOD OF PRODUCING SAID THE INVENTION

This invention relates to a ceramic abradable seal with a metallic base and a graded metal to ceramic structure which seal can withstand operating temperatures as high as 1650°C.

BACKGROUND

There are many applications wherein a close clearance space is required between a moving member and a stationary member. For example, in designing turbines, a formidable problem is encountered when trying to minimize the clearance space between the turbine blade and the turbine housing. Although a close tolerance fit can be obtained by fabricating mating parts to within a close tolerance range, the expense required for such a fabrication process limits its use in commercial applications. In addition, when the mated assembly is exposed to a high temperature environment, the coefficient of expansion of the mating members may be different thus causing the clearance space to increase or decrease. The latter condition could result in a frictional contact between the members which in turn would cause a higher temperature to exist and thereby possibly damage one or both members. In the former condition, the increased clearance space in a turbine would permit gas to escape between the turbine blade tip and the housing thus leading to a decrease in efficiency since the escaping gas represents energy that has not been fully utilized.

Various coating techniques have been employed to coat the inside diameter of the turbine housing with an abradable coating which can be worn if frictional contact of the turbine blade should occur due to thermal expansion or growth of the rotating parts and/or non concentric distortion of the case. These coatings are intended to minimize rotor damage and gas leakage across a turbine stage if frictional contacts are experienced. This abradable coating technique for turbines not only increases the operating efficiency of the turbine but also provides a quick and inexpensive method for reservicing excessively worn seal members of the turbine.

Abradable seals presently available are predominately metallic in composition and hence cannot be employed in high temperature environments, but are suitable in situations where surface temperatures do not exceed about 1150°C. Modern jet engines require seals capable of sustained operation at temperatures as high as 1650°C. Ceramic materials will withstand such temperatures and can be formed in porous coatings so as to provide abradable seals. A pure ceramic seal lacks the necessary ductility, however, and cannot be satisfactorily bonded to the superalloy metal substrates commonly employed.

These requirements make impractical the direct bonding of a ceramic abradable seal to the substrates commonly used in turbine applications. Such substrates must be superalloys, which melt at about 1400° to 1500°C and the required refractory and noble metals are not sufficiently oxidation resistant to operate in the turbine. Another serious drawback to the present ceramic/metal bonding technique is the inherently thin bond that this process developes. The ceramic and metal usually have different coefficients of thermal expansion and upon thermal cycling the resultant strain must be absorbed at the bond area, which is thin and highly stressed. Thus this type of structure is clearly deficient for withstanding the thermal cycling necessary for turbine application. Nonetheless a seal structure must be provided which will behave as a thermal barrier to protect the metal backing from high temperatures, yet be sacraficial and "abrade" away when a rotating turbine blade contacts it.

SUMMARY OF THE INVENTION

Broadly stated, the invention relates to an abradable seal which comprises a top layer of ceramic and a bottom layer of chromium-containing superalloy powder and which is suitable for use in gas turbines at temperatures of 1650°C or higher. At least two intermediate layers of ceramic/metal mixture are included to provide a structure gradated from all ceramic to all metal. The individual layers of ceramic and metal powders, mixed with water to form a paste, are laid down successively on top of one another to form the gradated structure. It is then dried gradually and placed on the metal substrate to which it is to be attached. The composite structure on the substrate is restrained under mild pressure and heated in a furnace until sintering and bonding is completed.

The first layer to be laid down in paste form is composed of substantially all ceramic, preferably in a "grog" or mixture of particle sizes ranging from about 325 mesh powder up to dense or hollow spheres of about 0.25 millimeter diameter. The refractory used may be an individual or mixture of those metal oxides which are resistant to thermal degradation at temperatures above about 1600°C. These include alumina, zirconia, ceria, yttria, silica and magnesia. Colloidal silica or other suitable material is preferably added as a binder, with up to 3 weight percent of silica preferred, although larger percentages may be used. If desired this ceramic layer may be applied as two layers, the first being composed of hollow ceramic spheres and the second of ceramic powder, rather than using a single layer of the grog. The thickness of this layer will vary with intended use but should be at least 1.25 millimeters.

The final or metallic layer which is applied is composed substantially or entirely of an oxidation-resistant chromium-containing superalloy metal powder mixed with a braze powder consisting of a a superalloy plus a brazing aid such as silicon, boron, phosphorous or the like. Suitable alloys include nickel/chromium, cobalt/chromium, iron/chromium and the like to which aluminum or titanium can be added. Colloidal silica or other suitable binder is added with up to about 3 percent by weight of silica preferred, although more may be used. The particle size for these metal powders is preferably between about 100 and 150 mesh, although somewhat smaller or larger particles can be used. This metallic layer is at least 0.25 millimeters thick and preferably from 0.75 to 1.5 millimeters.

The intermediate layers between initial ceramic layer and the final metal layer will be mixtures of ceramic powder and superalloy metal powder. Particle size for the ceramic powder which is a ceramic of this type described above for the all ceramic layer is no greater than 325 mesh. The particles of metal powder, which is the same type of superalloy described above for the all metal layer, will be at least 200 mesh and preferably from 100 to 150 mesh in size. Up to about 3 percent of less of a suitable binder such as colloidal silica or the like is preferably added to each of these layers, although more can be used if desired. The thickness of these intermediate layers should be at least 0.25 millimeters and can be as much as 1.5 millimeters, with about 1.0 millimeters preferred.

In the practice of the invention the all ceramic layer is made first using enough water to give it a paste-like consistency. This material is then spread out uniformly to the desired thickness and the layer of ceramic is placed in a mold. A layer of ceramic/metal powder mixtures is then made up, again with water added, and formed to the desired thickness after which it is layed on top of the first all ceramic layer. On top of this is added at least one more layer of ceramic/metal powder mixture, which layer contains a higher proportion of metal powder than the preceding layers. Additional layers of the ceramic/metal mixtures, if any, are laid down one by one and then the all metal powder layer, again with water added as needed, is placed on top.

After all the layers have been laid up in a mold or the like the composite is pressed at a pressure of at least 1 kilogram per square centimeter gauge, preferably about 175 kilograms per square centimeter gauge. This pressure is maintained while the composite is dried as in a drying oven. Temperatures up to about 125°C are employed for at least 2 hours. Slow heating for an extended period is employed to avoid rapid outgasing which could cause cracking of the structure. After drying the composite is ready for attachment to the substrate. The metallic substrate is first coated with a brazing powder of the type in the final layer of the composite and the composite structure is then placed on the substrate. Fixtures are then employed to hold the composite in contact with substrates. If the material of the composite expands readily upon heating a clamping device may be enough. Preferably a positive pressure device is employed, such as a bladder or the like. A pressure of about 70 grams per square centimeter gauge is normally sufficient to ensure good bonding of the composite to the substrate. Heat is applied in a protective atmosphere, such as hydrogen, argon, helium or the like. Temperatures of at least 1100°C must be achieved, with about 1225°C preferred.

The pressure applied to the composite is sufficient to maintain its integrity during drying and to keep it in contact with the substrate for brazing. It is important however that the pressure applied not be so great as to destroy the porosity of the ceramic layer. It is this porosity, this structure of sintered together but still individual particles which gives the ceramic layer its abradable nature whereby it is such a satisfactory seal material.

EXAMPLE 1

An abradable seal composite structure was formed and attached to a substrate in the following manner. A total of six different materials were used as follows:

List of Materials

| | |
|---|---|
| A | Hollow alumina spheres manufactured by Norton Co., Grade E163 bubbled alumina, 35/60 mesh size. |
| B | Alumina powder manufactured by Alcoa Co., grade A-10 −325 mesh |
| C | Meta Sodium Silicate, Anhydrous, −325 mesh |
| D | Colloidal Silica manufactured by Degussa, Aerosol 200 grade |

List of Materials-continued

| | |
|---|---|
| E | NiCr Powder (80 weight percent Ni-20 weight percent Cr) 100/150 mesh |
| F | NiCrSi braze powder, ASM 4782, 100/150 mesh |

These materials were used to make a total of eight different layers. The composition of the layers in weight percentages was as follows:

| Layer No. | Thickness in millimeters | A | B | C | D | E | F |
|---|---|---|---|---|---|---|---|
| 1 | 1.25–2.50 | 47 | 47 | 5 | 1 | 0 | 0 |
| 2 | 0.25 | 0 | 94 | 5 | 1 | 0 | 0 |
| 3 | 0.25 | 0 | 39 | 5 | 1 | 27.5 | 27.5 |
| 4 | 0.25 | 0 | 28 | 5 | 1 | 33 | 33 |
| 5 | 0.25 | 0 | 19 | 5 | 1 | 37.5 | 37.5 |
| 6 | 0.25 | 0 | 9 | 5 | 1 | 42.5 | 42.5 |
| 7 | 0.25 | 0 | 5 | 5 | 1 | 44.5 | 44.5 |
| 8 | 0.12 | 0 | 0 | 0 | 0 | 50 | 50 |

Layers 1 through 7 were mixed with sufficient water to form a workable paste

A thin film of polyester plastic was placed on a flat surface and layer 1 was spread uniformly on it with spacer bars used to give proper thickness and width. Entrapped bubbles were worked out and the surface was smooth and flattened. Layer 2 was formed and then layed on top of layer 1 and in a like manner layers 3 through 7 were formed and successively laid up upon the growing composite. the 8th layer, consisting of metal powder, was sprinkled on layer 7 while it was still wet and was then smoothed and flattened.

The wet composite was then placed over a suitable curved fixture to shape it to the correct radius. The support fixture substrate which had been coated with a 0.25 millimeter layer of 50 weight percent A and 50 weight percent B powder sintered in place was pressed on to the wet composite and the whole was placed in a containing fixture for drying. Drying was accomplished in a high humidity (approximately 95% humidity) chamber at a temperature of 45°C for 8 hours, then 70°C for 8 hours and finally 125°C for 2 hours. This drying cycle allows for a very slow drying period, to avoid outgassing which could cause cracking of the structure.

After the drying procedure was completed the sample was trimmed and made ready for furnacing. The composite and substrate were again put into a restraining fixture and were slowly heated in a dry hydrogen atmosphere. When the temperature reached 1000°C the bladder type fixture was pressurized to 35 grams per square centimeter gauge. This gently forced the composite into intimate contact with the substrate. When the temperature reached 1225°C the pressure was increased to 70 grams per square centimeter gauge and these conditions were held for 2 hours. Cooling was then allowed to occur with the 70 grams per square centimeter gauge pressure held until the temperature dropped to 1000°C. The pressure was then reduced to 35 grams per square centimeter and held there until the temperature dropped to 875°C. At this point all pressure was removed and the assembly was taken out of the furnace with processing completed. The result was a porous abradable ceramic surface firmly adhered to a metal substrate, resistant to oxidizing atmospheres and temperatures up to at least 1650°C and capable of undergoing extensive thermal cycling without damage.

EXAMPLE 2

An abradable seal composite structure was formed and attached to a substrate in a manner similar to that of Example 1. Five different materials were used as follows:

- A Hollow CaO stabilized zirconia spheres, manufactured by Norton Co., grade Zirnorite I, bubbled zirconia
- B 16.9 weight percent yttria stabilized zirconia powder manufactured by Zircoa Co., −325 mesh
- C Colloidal silica manufactured by Du Pont Co., grade positive Sol 130 M
- D NiCr powder (80 weight percent Ni-20 weight percent Cr) Made by various manufacturers, 100/150 mesh
- E NiCrSi braze powder, ASM 4782, 100/150 mesh These materials were used to make a total of eight different layer compositions. The composition in weight percentages of the layers was as follows:

| Layer No. | Thickness in millimeters | A | B | C | D | E |
|---|---|---|---|---|---|---|
| 1 | 1.25 | 40 | 54 | 6 | 0 | 0 |
| 2 | 0.5 | 0 | 50 | 10 | 30 | 10 |
| 3 | 0.25 | 0 | 43 | 7 | 37.5 | 12.5 |
| 4 | 0.25 | 0 | 35 | 5 | 45 | 15 |
| 5 | 0.25 | 0 | 25 | 5 | 52.5 | 17.5 |
| 6 | 0.25 | 0 | 15 | 5 | 60 | 20 |
| 7 | 0.25 | 0 | 5 | 5 | 67.5 | 22.5 |
| 8 | 0.12 | 0 | 0 | 0 | 50 | 50 |

Layers 1 through 7 were mixed with sufficient water to form a suitable paste.

The layers were formed and assembled in the same manner as in Example 1 and the composite was dried and attached to a metal substrate in the same manner as in Example 1. A similar porous abradable surface was obtained.

EXAMPLE 3

An abradable seal composite structure was attached to a substrate in a manner similar to that of Example 1. Six different materials were used as follows:

- A Hollow CaO stabilized zirconia spheres, manufactured by Norton Co., grade Zirnorite I, bubbled zirconia
- B 16.9 weight percent ytteria stabilized zirconia powder, manufactured by the Zircoa Co., −325 mesh
- C Colloidal silica, manufactured by Du Pont Co., grade Positive Sol 130M (a water suspension)
- D Jaguar Polymer J B, a guar gum derivative, manufactured by Stein, Hall and Co., as a binder
- E NiCr powder (80 weight percent Ni-20 weight percent Cr) 100/150 mesh
- F Amdry 400 braze powder, Co, Cr, Ni, Si, B50T56 140/270 mesh Certain of these were premixed to aid in uniformity and ease of construction. A one percent solution of D was made with C and is referred to as binder. A 25 weight percent mixture of F was made with E and is referred to as metal powder. The ceramic material of material A was classified into two components by size. These materials were used to make a total of five different layers. The weight percent compositions of the layers was as follows:

| Layer No | Thickness in millimeters | A 35/72 mesh | A 100/50 mesh | B | Metal | Binder |
|---|---|---|---|---|---|---|
| 1 | 1.25-3.75 | 41 | 9 | 41 | 0 | 9 |
| 2 | 0.9 | 0 | 18 | 36 | 36 | 10 |
| 3 | 0.9 | 0 | 14 | 23 | 55 | 8 |
| 4 | 0.9 | 0 | 0 | 23 | 68 | 9 |
| 5 | 0.9 | 0 | 0 | 9 | 82 | 9 |

With spacer bars used to give proper thickness and width layer 1. was spread uniformly on a piece of thin (0.1 millimeter) nickel foil. This was then transferred to a mold of desired shape. The second layer was made in a similar manner as the first, except it was put on thin (0.037 millimeter) polyester (Mylar) film. It was inverted and placed on top of the first layer in the mold and the polyester film was peeled off exposing the new surface ready to accept the third layer. The remaining layers were made and added in a similar fashion. When all the layers had been laid up in the mold it was put under a pressure of 175 kilograms per square centimeter and bolted. The mold containing the composite was placed in a drying oven first for 5 hours at a temperature of 45°C, then for 5 hours at 80°C and finally for 5 hours at 125°C. The composite was then brazed to a metallic substrate fixture in the same manner as in Example 1. The result in this example, as in Examples 1 and 2 was a porous abradable ceramic surface firmly adhered to a metal substrate, resistant to oxidizing spheres at temperatures until at least 1650°C and capable of undergoing extensive thermal cycling without damage.

What is claimed is:

1. A multi-layer composite, sintered, abradable seal, which is resistant to thermal cycling and has a porous, abradable ceramic surface layer which is resistant to high temperature oxidation and a metallic bottom layer bonded to a metallic substrate, with at least two intermediate layers of ceramic/metal mixture, the relative proportions of ceramic and metal in each intermediate layer being gradated with respect to the other layers, with the highest percentage of ceramic in the intermediate layer adjacent to the ceramic surface layer and the composition in each succeeding layer being successively gradated to be lower in the proportion of ceramic with respect to the composition of the preceding layer.

2. A structure according to claim 1 wherein said ceramic surface layer is resistant to at least 1650°C in an oxidizing atmosphere.

3. A structure according to claim 1 wherein said ceramic surface layer comprises essentially particles of at least one metal oxide selected from the group consisting of aluminia, zirconia, ceria, yttria, silica and magnesia.

4. A structure according to claim 3 wherein said ceramic layer contains a minor amount of a binder.

5. A structure according to claim 1 wherein said metallic bottom layer comprises essentially an oxidation-resistant chromium-containing superalloy powders and a brazing aid.

6. A structure according to claim 5 wherein a metallic layer contains a minor amount of binder.

7. A structure according to claim 5 wherein said brazing aid is selected from the group consisting of silicon, boron and phosphorous.

8. A structure according to claim 5 wherein said alloy is nickel-chromium.

9. A structure according to claim 1 wherein said intermediate layers contain a minor amount of binder.

10. A structure according to claim 1 wherein there are two intermediate layers

11. A structure according to claim 1 wherein there are three intermediate layers 12. A structure according to claim 1 wherein there are four intermediate layers 13. A structure according to claim 1 wherein there are five intermediate layers 14. A structure according to claim 1 wherein said ceramic surface layer is comprised predominately of relatively large hollow ceramic spheres and a second ceramic layer is present immediately below said surface layer, said second ceramic layer being comprised of smaller dense ceramic particles.

15. Process for producing a porous abradable seal on a turbine engine surface which comprises:
   a. forming a surface layer of desired thickness comprising particles of a ceramic material mixed with water and a binder to form a paste.
   b. forming an intermediate layer of desired thickness comprising particles of said ceramic material mixed with particles of a chromium-containing superalloy, water and a binder to form a paste, placing said layer on top of said surface layer.
   c. forming at least one additional intermediate layer as in step b, each such successive intermediate layer having a ratio of metal to ceramic gradated higher than that of the preceding intermediate layer, and placing each such additional intermediate layer on top of the preceding intermediate layer.
   d. forming a metallic bottom layer of desired thickness comprising particles of a chromium-containing thickness comprising particles of a chromium-containing superalloy mixed with a brazing aid and water to form a paste, placing said metallic layer on top of the last intermediate layer.
   e. restraining the assembled layers in a suitable fixture under an initial pressure of at least 175 kilograms per square centimeter gauge and then slowly heating to dryness to thereby form a multi-layer composite.
   f. coating the surface of a metallic substrate fixture with a brazing powder comprising metal powder of the type used in step d plus a brazing aid.
   g. placing the dried composite on the coated metallic substrate, with the metallic bottom layer in contact with said substrate, and heating to a temperature of at least 1100°C in an inert or reducing atmosphere, under a pressure sufficient to maintain said composite in contact with said substrate for a time sufficient to sinter said composite and bond said composite to said substrate.

* * * * *

UNITED STATES PATENT OFFICE
CERTIFICATE OF CORRECTION

Patent No. 3,975,165              Issue Date August 17, 1976

Inventor(s) Raymond John Elbert and Alan De Vere Butcher
(See Item 2, below.)

It is certified that error appears in the above-identified patent and that said Letters Patent are hereby corrected as shown below:

Item [54] "GRADED METAL-TO-CERAMIC STRUCTURE FOR HIGH TEMPERATURE ABRADABLE SEAL APPLICATIONS AND A METHOD OF PRODUCING SAID" should be --GRADED METAL-TO-CERAMIC STRUCTURE FOR HIGH TEMPERATURE ABRADABLE SEAL APPLICATIONS AND METHOD OF PRODUCING SAME--

Item [75] "Inventors: Raymond John Elbert, Middleburg Heights; Alan De Vere Butcher, Parma Heights, both of Ohio"

should be
--Inventors: Raymond John Elbert, Middleburg Heights, Ohio; Gentaro Matsumura, Struttgart, West Germany; and Alan De Vere Butcher, Parma Heights, Ohio--

| | |
|---|---|
| Column 3, Line 2: | "percent of" should be --percent or-- |
| Column 3, Line 15: | "it is layed" should be --it is laid-- |
| Column 3, Line 30: | "outgasing" should be --outgassing-- |
| Column 4, Line 27: | "was smooth and" should be --was smoothe and-- |
| Column 4, Line 28: | "then layed on" should be --then laid on |
| Column 6, Line 60: | "powders" should be --powder-- |

UNITED STATES PATENT OFFICE
CERTIFICATE OF CORRECTION

Patent No. 3,975,165           Dated August 17, 1976

Inventor(s) Raymond John Elbert and Alan De Vere Butcher

It is certified that error appears in the above-identified patent and that said Letters Patent are hereby corrected as shown below:

Column 8, lines 6-9: "d. forming a metallic bottom layer of desired thickness comprising particles of a chromium-containing thickness comprising particles of a chromium containing superalloy mixed with a brazing aid and"

should be --d. forming a metallic bottom layer of desired thickness comprising particles of a chromium-containing superalloy mixed with a brazing aid and--

Signed and Sealed this

Twenty-second Day of February 1977

[SEAL]

Attest:

RUTH C. MASON
Attesting Officer

C. MARSHALL DANN
Commissioner of Patents and Trademarks